US012707309B2

(12) United States Patent
Shariat et al.

(10) Patent No.: US 12,707,309 B2
(45) Date of Patent: Aug. 11, 2026

(54) NETWORK ANALYTICS BASED ON MULTIPLE RESOLUTIONS OF UE LOCATIONS

(71) Applicant: Samsung Electronics Co., Ltd., Suwon-si (KR)

(72) Inventors: Mehrdad Shariat, Staines (GB); Chadi Khirallah, Staines (GB); David Gutierrez Estevez, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/289,673

(22) PCT Filed: May 10, 2022

(86) PCT No.: PCT/KR2022/006670
§ 371 (c)(1),
(2) Date: Nov. 6, 2023

(87) PCT Pub. No.: WO2022/240147
PCT Pub. Date: Nov. 17, 2022

(65) Prior Publication Data

US 2024/0244466 A1 Jul. 18, 2024

(30) Foreign Application Priority Data

May 10, 2021 (GB) .................................... 2106653
Nov. 5, 2021 (GB) .................................... 2115953
Apr. 22, 2022 (GB) .................................... 2205918

(51) Int. Cl.
*H04W 24/10* (2009.01)
*H04W 4/02* (2018.01)
*H04W 24/02* (2009.01)

(52) U.S. Cl.
CPC .......... *H04W 24/10* (2013.01); *H04W 4/023* (2013.01); *H04W 24/02* (2013.01)

(58) Field of Classification Search
None
See application file for complete search history.

(56) References Cited

U.S. PATENT DOCUMENTS 10,399,495 B1 9/2019 Osborne
2018/0249361 A1 8/2018 Otsuki et al.
(Continued)

OTHER PUBLICATIONS

3GPP TS 23.288 V17.0.0 (Mar. 2021), "Architecture enhancements for 5GS to support network data analytics services" (Release 17) (Year: 2021).*

(Continued)

*Primary Examiner* — Walter J Divito
(74) *Attorney, Agent, or Firm* — Jefferson IP Law, LLP

(57) ABSTRACT

The disclosure relates to a 5G or 6G communication system for supporting a higher data transmission rate. A method performed by a first network entity in a mobile communication system for providing information relating to the relative proximity of one or more user equipments (UEs) is provided. The method includes receiving, from a second network entity, a request for network analytics; receiving, from one or more third network entities, input data relating to the UEs; generating analytics based on the input data; and providing the generated analytics to the second network entity as a response to the request. The request comprises an analytics identifier (ID) indicating relative proximity information.

15 Claims, 4 Drawing Sheets

(56) References Cited

U.S. PATENT DOCUMENTS

2020/0252813 A1 8/2020 Li et al.
2023/0074288 A1* 3/2023 Filippou ............... H04L 47/127

OTHER PUBLICATIONS

XP051934728—3GPP TR 23.700-91 V0.5.0, 3rd Generation Partnership Project; Technical Specification Group Services and System Aspects; Study on enablers for network automation for the 5G System (5GS); Phase 2 (Release 17).
XP052029387—3GPP TS 23.288 V17.1.0, 3rd Generation Partnership Project; Technical Specification Group Services and System Aspects; Architecture enhancements for 5G System (5GS) to support network data analytics services (Release 17).
3GPP Standard, 3rd Generation Partnership Project, Technical Specification Group Services and System Aspects; Architecture enhancements for 5G System (5GS) to support network data analytics services (Release 17), Sep. 2021.
3GPP Draft, 3rd Generation Partnership Project; Technical Specification Group Services and System Aspects; Study on enablers for network automation for the 5G System (5GS); Phase 2 (Release 17), Sep. 2020.
Samsung, New solution on relative proximity analytics, 3GPP S2-2203379 (3GPP Draft, vol. SA WG2, KI#9: Apr. 12, 2022, Elbonia.
Samsung, Update to NF Load Analytics, S2-2103266, 3GPP TSG-WG SA2 Meeting #144E emeeting, Apr. 19, 2021, Elbonia.
Nokia et al., Analytics aggregation—EN resolutions, S2-2103253, 3GPP TSG-WG SA2 Meeting #144E e-meeting, Apr. 20, 20, 2021, Elbonia.
Catt, Data collection within Aol for specific UEs, S2-2103251, SA WG2 Meeting #144E (e-meeting), Apr. 20, 2021, Elbonia.
LG Electronics, Clarification on applying analytics subsets, S2-2103273, 3GPP TSG-SA WG2 Meeting #144E (e-meeting), Apr. 19, 2021, Elbonia.
Great Britain Search Report dated Jul. 19, 2022, issued in GB Patent Application No. 2115953.8.
Great Britain Search Report dated Sep. 27, 2022, issued in GB Patent Application No. 2205918.2.
International Search Report dated Aug. 17, 2022, issued in International Patent Application No. PCT/KR2022/006670.
Great Britain Search Report dated Dec. 13, 2023, issued in Great Britain Patent Application No. 2205918.2.
Extended European Search Report dated Feb. 27, 2024, issued in European Patent Application No. 22807795.4.

* cited by examiner

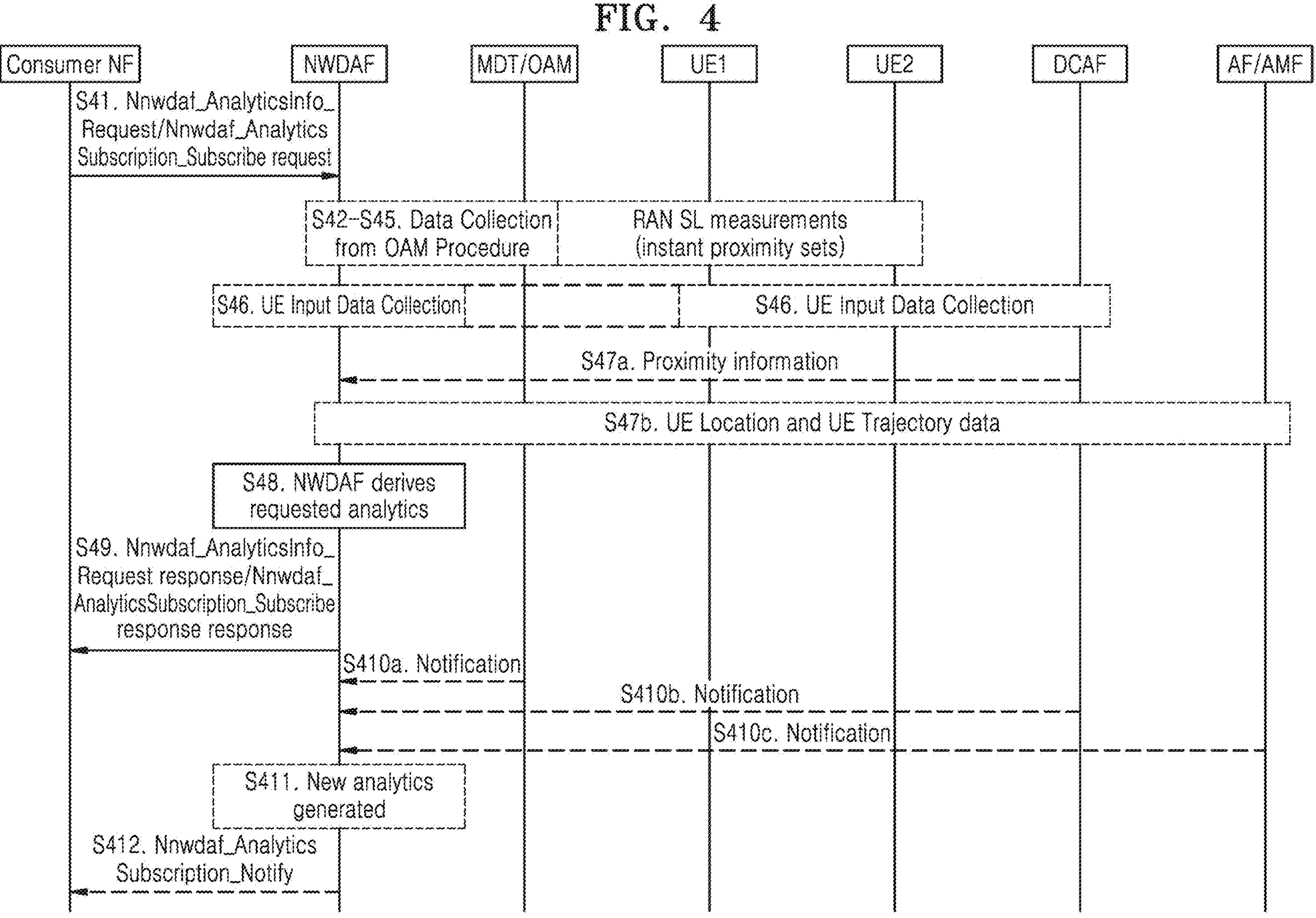
FIG. 4
Consumer NF
NWDAF
MDT/OAM
UE1
UE2
DCAF
AF/AMF
S41. Nnwdaf_AnalyticsInfo_Request/Nnwdaf_Analytics Subscription_Subscribe request
S42~S45. Data Collection from OAM Procedure
RAN SL measurements (instant proximity sets)
S46. UE Input Data Collection
S46. UE input Data Collection
S47a. Proximity information
S47b. UE Location and UE Trajectory data
S48. NWDAF derives requested analytics
S49. Nnwdaf_AnalyticsInfo_Request response/Nnwdaf_AnalyticsSubscription_Subscribe response response
S410a. Notification
S410b. Notification
S410c. Notification
S411. New analytics generated
S412. Nnwdaf_Analytics Subscription_Notify

NETWORK ANALYTICS BASED ON MULTIPLE RESOLUTIONS OF UE LOCATIONS

TECHNICAL FIELD

Certain examples of the present disclosure provide methods, apparatus and systems for providing information based on multiple resolutions of UE locations in a network, wherein the location information is either absolute location or relative location with respect to other UEs. For example, certain examples of the present disclosure provide methods, apparatus and systems for providing information based on UE locations in a 3GPP 5G network using NWDAF data analytics.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

Herein, the following documents are referenced:

Architecture enhancements for 5G System (5GS) to support network data analytics services, 3GPP SA2 TS23.288, Release 17

System Architecture for the 5G System, 3GPP SA2 TS 23.501, Release 17

Procedures for the 5G System, 3GPP SA2 TS 23.502, Release 17

NWDAF represents an (operator-managed) network analytics logical function providing (slice specific) network data analytics to NFs and/or AFs. A Network Slice (NS) is defined (e.g. in System Architecture for the 5G System, 3GPP SA2 TS 23.501, Release 17) as a logical network that provides specific network capabilities and network characteristics. A NS may be identified by Single Network Slice Selection Assistance Information (S-NSSAI). A NF or AF may subscribe to network analytics provided by NWDAF. NWDAF collects data from NFs, AFs and/or OAM and derives network analytics. NWDAF provides suitable network analytics to subscribed NFs and/or AFs, for example based on triggering events.

The following is stated in 3GPP TS 23.501 V17.2.0, Clause 6.2.18:

The Network Data Analytics Function (NWDAF) includes one or more of the following functionalities:

Support data collection from NFs and AFs;

Support data collection from OAM;

NWDAF service registration and metadata exposure to NFs and AFs;

Support analytics information provisioning to NFs and AFs;

Support Machine Learning (ML) model training and provisioning to NWDAFs (containing Analytics logical function).

The details of the NWDAF functionality are defined in TS 23.288 [86].

The following is stated in 3GPP TS 23.288 V17.2.0, Clause 4.1:

The NWDAF (Network Data Analytics Function) is part of the architecture specified in TS 23.501 and uses the mechanisms and interfaces specified for 5GC in TS 23.501 and OAM services (see clause 6.2.3.1).

The NWDAF interacts with different entities for different purposes:

Data collection based on subscription to events provided by AMF, SMF, PCF, UDM, AF (directly or via NEF), and OAM;

[Optionally] Analytics and Data collection using the DCCF (Data Collection Coordination Function);

Retrieval of information from data repositories (e.g. UDR via UDM for subscriber-related information);

[Optionally] Storage and retrieval of information from ADRF (Analytics Data Repository Function);

[Optionally] Analytics and Data collection from MFAF (Messaging Framework Adaptor Function);

Retrieval of information about NFs (e.g. from NRF for NF-related information);

On demand provision of analytics to consumers, as specified in clause 6.

Provision of bulked data to consumers, as specified in clause 6.

A single instance or multiple instances of NWDAF may be deployed in a PLMN. If multiple NWDAF instances are deployed, the architecture supports deploying the NWDAF as a central NF, as a collection of distributed NFs, or as a combination of both. If multiple NWDAF instances are deployed, an NWDAF can act as an aggregate point (i.e. Aggregator NWDAF) and collect analytics information from other NWDAFs, which may have different Serving Areas, to produce the aggregated analytics (per Analytics ID), possibly with Analytics generated by itself.

NOTE 1: When multiple NWDAFs exist, not all of them need to be able to provide the same type of analytics results, i.e. some of them can be specialized in providing certain types of analytics. An Analytics ID information element is used to identify the type of supported analytics that NWDAF can generate.

NOTE 2: NWDAF instance(s) can be collocated with a 5GS NF.

3GPP has been standardizing specifications for enabling network automation (eNA) (e.g. in TS23.288 and also partly in TS 23.501 and TS 23.502).

The NWDAF is an integral part of eNA work specified since Release 15 and uses the mechanisms and interfaces specified for 5G Core (5GC) and Operations, Administration and Maintenance (OAM).

In a service-based architecture, each network function (NF) comprises a set of services that interfaces it (as the producer of such services) to other NFs (as the consumer of those services) over a common bus known as service based interface (SBI).

As noted above, the NWDAF can collect input data from different NFs (including Application Functions) and OAM. The NWDAF can process such data to derive output analytics and prediction data. Such output data can be used by different consumer NFs to assist them in their respective operations.

Each family of use cases for analytics and predictions from NWDAF has its distinct analytics type, identified by a certain analytics ID. A consumer NF indicates the required analytics ID as part of the request or subscription to the NWDAF along with other input elements, for example target of analytics reporting (e.g. a single UE, group of UEs or any UE), analytics filters (e.g. area of interest) or granularity of information required.

Currently, if the data analytics requires UE location information, for example for the analytics IDs "UE Mobility", "Abnormal behaviour", or "User Data Congestion", NWDAF may request such input data from AMF.

On the other hand, other attributes related to UE mobility, for example UE trajectory, can be collected from the Application Function (AF), either directly for a trusted AF in the MNO domain or via Network Exposure Function (NEF) for an untrusted AF outside the MNO domain.

Furthermore, for the purpose of load balancing between NFs within 5GC, collective behaviour information can also be collected from the UEs via the AF for data collection (DCAF), either directly for a trusted AF in the MNO domain or via NEF for an untrusted AF outside MNO domain.

The above information is presented as background information only to assist with an understanding of the present disclosure. No determination has been made, and no assertion is made, as to whether any of the above might be applicable as prior art with regard to the present invention.

In the present disclosure, the following acronyms/definitions are used.

GPP 3rd Generation Partnership Project
5G 5th Generation
5GC 5G Core
5GS 5G System
ADRF Analytics Data Repository Function
AF Application Function
AMF Access and Mobility Management Function
AS Application Server
DCAF Data Collection Application Function
DCCF Data Collection Coordination Function
DDNMF Direct Discovery Network Management Function
DNN Data Network Name
eNA enabling Network Automation
GMLC Gateway Mobile Location Centre
GPSI General Public Subscription Identifier
ID Identity/Identifier
IE Information Element
LMF Location Management Function
MDT Minimization of Driving Test
MFAF Messaging Framework Adaptor Function
ML Machine Learning
MNO Mobile Network Operator
NEF Network Exposure Function
NF Network Function
NRF Network Repository Function
NS Network Slice
NWDAF Network Data Analytics Function
OAM Operations, Administration and Maintenance
PCF Policy Control Function
PLMN Public Land Mobile Network
ProSe Proximity based Services
RAN Radio Access Network
SBI Service Based Interface
SMF Session Management Function
S-NSSAI Single Network Slice Selection Assistance Information
SUPI Subscription Permanent Identifier
TA Tracking Area
TAI Tracking Area Identity
TS Technical Specification
UDM Unified Data Management
UDR Unified Data Repository
UE User Equipment

DISCLOSURE OF INVENTION

Solution to Problem

In an embodiment, a method performed by a first network entity in a mobile communication system for providing information relating to the relative proximity of one or more user equipments (UEs) is provided. The method includes receiving, from a second network entity, a request for network analytics; receiving, from one or more third network entities, input data relating to the UEs; generating analytics based on the input data; and providing the generated analytics to the second network entity as a response to the request. The request comprises an analytics identifier (ID) indicating relative proximity information.

In an embodiment, a first network entity in a mobile communication system for providing information relating to the relative proximity of one or more UEs is provided. The first network entity includes a transceiver and a controller. The controller is configured to receive, from a second network entity via the transceiver, a request for network analytics, receive, from one or more third network entities via the transceiver, input data relating to the UEs, generate analytics based on the input data, and provide the generated analytics to the second network entity as a response to the request. The request comprises an analytics ID indicating relative proximity information.

In an embodiment, a method for estimation of a network function (NF) load for an area of interest in a 5G mobile communications system comprising a Network Data Analytics Function (NWDAF) and a User Equipment (UE), the method performed by the NWDAF and comprising: collecting one or more of trajectory data of the UE, Minimization of Drive Tests (MDT) input data of the UE, and collective behaviour input data of the UE; and estimating a NF load for the area of interest based on at least one of the trajectory data of the UE, the MDT input data of the UE, and the collective behaviour data of the UE.

In an embodiment, when more than one of the data is collected, combining the collected data to improve the accuracy of the estimation.

In an embodiment, the trajectory data of the UE is collected from an application function (AF) of the 5G mobile communications system.

In an embodiment, the MDT input data is collected from an Operations, Administration and Maintenance (OAM) entity of the 5G mobile communications system.

In an embodiment, the collective behaviour input data is collected from a Data Collection AF or Network Exposure Function (NEF) of the 5G mobile communications system.

In an embodiment, the trajectory data of the UE includes at least one of a geographical area that the UE has entered and a timestamp when the UE entered the geographical area.

In an embodiment, the MDT data includes at least one of a speed of the UE and an orientation of the UE.

In an embodiment, the collective behaviour input data comprises at least one of a type of the collective behaviour, a total number of UEs that fulfil the collective behaviour within the area of interest, a time stamp of a time that the collective behaviour is derived, and an identity of an AF providing the collective behaviour information.

In an embodiment, the NF load is a current average load of the NF over the area of interest or a predicted average load of the NF over the area of interest In an embodiment, a 5G mobile communications system comprising a Network Data Analytics Function (NWDAF) and a User Equipment (UE), wherein the NWDAF is arranged to: collect one or more of trajectory data of the UE, Minimization of Drive Tests (MDT) input data of the UE, and collective behaviour input data of the UE; combine different sources of data to improve the accuracy of estimation; and estimate a Network Function (NF) load for an area of interest based on at least one of the trajectory data of the UE, the MDT input data of the UE, and the collective behaviour data of the UE.

In an embodiment, a computer-readable recording medium having stored thereon computer-executable instructions arranged to implement the method of any of clauses 1 to 9 in a 5G mobile communications system.

Further examples related to the use of multiple resolutions of UE location data (e.g. relative and absolute UE location data) as described with reference to FIG. 4 are set out in the following numbered paragraphs, where the subject matter of these paragraphs may be combined with the subject matter disclosed above in relation to FIG. 4.

In an embodiment, a method for providing information relating to a relative proximity of one or more UEs in a network comprising the UEs and a first network entity providing network analytics, the method comprising: receiving, by the first network entity from a second network entity, a request for network location analytics; receiving, by the first network entity from one or more third network entities, location input data relating to the UEs, wherein the location input data includes UE relative proximity information and at least one further UE location information; generating, by the first network entity, analytics based on the location input data; and providing the generated analytics to the second network entity as a response to the request, wherein the request for network analytics comprises an Analytics ID indicating one or more of UE relative proximity information, UE location information, and UE trajectory information.

In an embodiment, the location input data includes relative proximity information of the one or more UEs, and one or more of (absolute) location information of the one or more UE, and trajectory data of the one or more UEs.

In an embodiment, the generating the analytics comprises one or more of verifying, cleansing, or improving the accuracy of the relative proximity information based on UE location data and/or UE trajectory data.

In an embodiment, the request comprises a target for analytics reporting.

In an embodiment, the target for analytics reporting comprises one or more of: a single UE; a group of UEs; and any UE.

In an embodiment, the request comprises one or more analytics filters.

In an embodiment, when the request includes a request for relative proximity information, the one or more analytics filters comprise one or more of: a proximity range (e.g. an area of interest, one or more directions of interest, and/or a ranging distance); a minimum or maximum number of UEs to be accounted for relative positioning; a velocity, average speed, orientation, and/or mobility trajectory to be accounted for relative positioning; an S-NSSAI; a DNN; an analytics target period; and a specified level of accuracy of the analytics.

In an embodiment, the third network entity comprises one or more of an OAM entity, a DCAF entity, an AF entity, and an AMF entity.

In an embodiment, the location input data comprises one of more of the data set out in the following tables;

| Information | Source | Description |
|---|---|---|
| Per UE information | OAM | |
| >Speed | | UE Speed |
| >Orientation | | UE Orientation |
| >Instant proximity set | | A (set of) UE ID(s) or Group ID(s) in the instant proximity of a target UE. |

| Information | Source | Description |
|---|---|---|
| Proximity Attribute | DCAF/NEF | Characterise a set of UEs in relative proximity based on the criteria set |
| >Number of UEs | | Total number of UEs that fulfil a proximity criteria |
| >Timestamp | | A time stamp of time that the proximity attribute derived. |
| >Application ID(s) | | Identifying the applications(s) providing this information |
| >List of UE IDs | | UE IDs that fulfil a proximity criteria. |

-continued

| Information | Source | Description |
|---|---|---|
| >Other attribute(s) | | Other attributes the set of UEs in proximity fulfil as a collective attribute (e.g. destination, route, average speed, time of arrival) |
| >Confidence | | Confidence on relative proximity data |

| Information | Description |
|---|---|
| UE ID | Could be external UE ID (i.e. GPSI) |
| Application ID | Identifying the application providing this information |
| UE trajectory (1 . . . max) | Timestamped UE positions |
| >UE location | Geographical area that the UE enters |
| >Timestamp | A time stamp when UE enters this area |

| Information | Source | Description |
|---|---|---|
| UE Speed | OAM (see NOTE 1) | UE Speed (see TS 37.320 [20]). |

-continued

| Information | Source | Description |
|---|---|---|
| UE Orientation | OAM (see NOTE 1) | UE Orientation (see TS 37.320 [20]). |

(NOTE 1):
UE input data collection for a specific UE from OAM (via MDT), is as captured in clause 6.2.3.1.

| Information | Source | Description |
|---|---|---|
| Collective Attribute | AF/NEF (see NOTE 1) | Characterise collective attribute per set of UEs (see Table 6.5.2-4) within the area of interest. |
| >Number of UEs | | Total number of UEs that fulfil a collective behaviour within the area of interest. |
| >Timestamp | | A time stamp of time that the collective attribute derived. |
| >Application ID(s) | (see NOTE 2) | Identifying the application providing this information |

(NOTE 1):
For collective behaviour attribute, data processing procedure is as defined in clause 6.2.8.
(NOTE 2):
The application ID(s) (either external or Internal) is optional. If the application ID(s) is not provided, the relevant application ID(s) can be identified by NWDAF based on the relevant event ID as registered in NRF as covered in clause 6.2.8.

In an embodiment, the analytics comprises one or more of statistics and predictions.

In an embodiment, the statistics comprise information according to the following table:

| Information | Description |
|---|---|
| UE group ID or set of UE IDs | Identifies a group of UEs or a set of UEs, e.g. internal group ID, external group ID, list of SUPIs, list of GPSIs or other external UE IDs. |
| Time slot entry (1 . . . max) | List of time slots during the Analytics target period |
| >Time slot start | Time slot start within the Analytics target period |
| >Duration | Duration of the time slot |
| >UE proximity attribute | Observed proximity data |
| >>relative proximity pattern | Observed Information of proximity changes |
| >>Sampling Ratio | Percentage of UEs accounted based on proximity criteria |
| >>Level of Accuracy | Accuracy level achieved |

In an embodiment, the predictions comprise information according to the following table:

| Information | Description |
|---|---|
| UE group ID or set of UE IDs | Identifies a group of UEs or a set of UEs, e.g. internal group ID, external group ID, list of SUPIs, list of GPSIs or other external UE IDs. |
| Time slot entry (1 . . . max) | List of predicted time slots |
| >Time slot start | Time slot start time within the Analytics target period |
| >Duration | Duration of the time slot |
| >UE proximity attribute | Predicted proximity data |
| >>relative proximity pattern | Predicted Information of proximity changes |
| >>Confidence | Confidence of this prediction |
| >>Sampling Ratio | Percentage of UEs accounted based on proximity criteria |
| >>Level of Accuracy | Accuracy level achieved |

In an embodiment, generating the analytics comprises combining input data received from two or more third network entities.

In an embodiment, the method of any preceding paragraph, further comprising: receiving further input data from the one or more third network entities; generating new and/or updated analytics based on the further input data; and providing the new and/or updated analytics to the second network entity.

In an embodiment, further comprising subscribing, by the first network entity, to one or more services provided by one or more of the third network entities for receiving the input data.

In an embodiment, the subscription request to the third network entity comprises one or more Event IDs, target for event reporting, and/or event filters corresponding to one or more Analytics IDs, target for analytics, and/or analytics filters included in the request for analytics received by the first network entity from the second network entity.

In an embodiment, at least one of the third network entities collects information from one or more UEs for providing the input data to the first network entity.

In an embodiment, the at least one third network entity collects the information directly from the one or more UEs and/or indirectly.

In an embodiment, the first network entity is a Network Data Analytics Function (NWDAF).

In an embodiment, a first network entity configured to operate according to a method of any preceding paragraph.

In an embodiment, a second network entity configured to cooperate with a first network entity of paragraph 20 according to a method of any of paragraphs 1 to 18.

In an embodiment, a wireless communications network comprising one or more network entities according to paragraph 20 and/or paragraph 21.

In an embodiment, a computer-readable recording medium having stored thereon instructions which, when executed by a computer or processor, cause the computer or processor to carry out a method according to any of paragraphs 1 to 19.

Other aspects, advantages and salient features of the invention will become apparent to those skilled in the art from the following detailed description taken in conjunction with the accompanying drawings.

BRIEF DESCRIPTION OF DRAWINGS

FIG. 4 is a flow diagram of a third example of the present disclosure illustrating an exemplary procedure for collecting UE relative proximity information, and absolute UE location information, including UE location and UE trajectory data.

MODE FOR THE INVENTION

Figure 1:
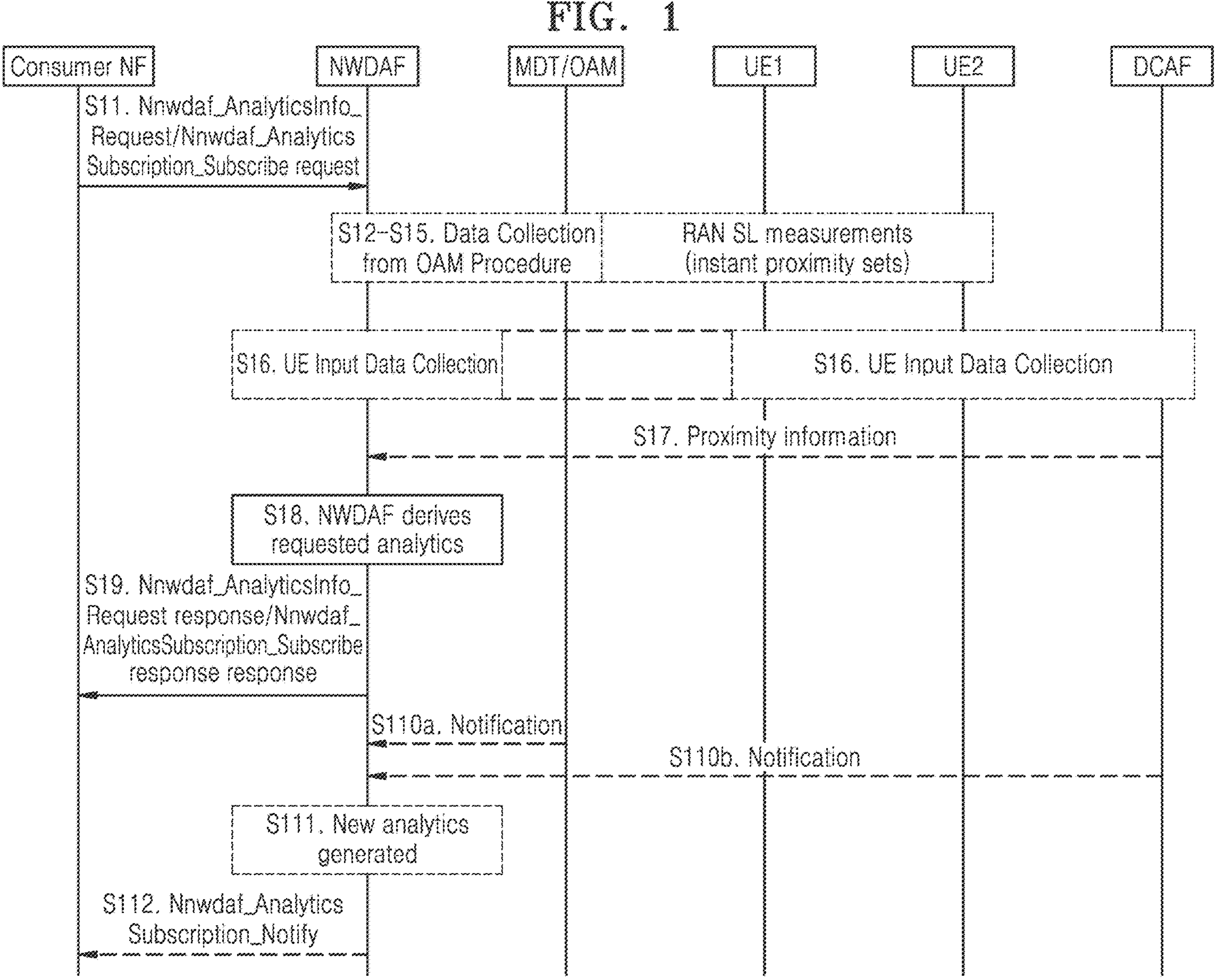
FIG. 1 is a flow diagram of a first example of the present disclosure illustrating an exemplary procedure for collecting relative proximity information.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim are to be understood to be applicable to any other aspect, embodiment, example or claim described herein unless incompatible therewith.

Certain examples of the present disclosure provide methods, apparatus and systems for providing information relating to the relative proximity of UEs in a network. For example, certain examples of the present disclosure provide methods, apparatus and systems for providing information relating to the relative proximity of UEs in a 3GPP 5G network using NWDAF data analytics. Certain example of the present disclosure also provide methods, apparatus and systems for providing information relating to UE locations and UE trajectories, and NF loading (per area of interest) statistics. However, the skilled person will appreciate that the present invention is not limited to these examples, and may be applied in any suitable system or standard, for example one or more existing and/or future generation wireless communication systems or standards, including any existing or future releases of the same standards specification, for example 3GPP 5G.

The following examples are applicable to, and use terminology associated with, 3GPP 5G. However, the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network. For example, the functionality of the NWDAF in the examples below may be applied to any other suitable type of entity providing network analytics; the functionality of the OAM in the examples below may be applied to any other suitable type of entity providing operations, administration and maintenance functions; and the functionality of the DCAF in the examples below may be applied to any other suitable type of entity performing data collection functions. The skilled person will also appreciate that the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualised function instantiated on an appropriate platform, e.g. on a cloud infrastructure.

The skilled person will appreciate that the present invention is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further entities and/or messages may be added to the examples disclosed herein.

One or more non-essential entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system (e.g. network or wireless communication system) comprising one or more such apparatuses/devices/network entities, and/or a method therefor.

As noted above, analytics based on location information may be requested. Typically, location information is available with the relatively coarse resolution of Tracking Area (TA) level or cell level. Furthermore, location information is typically related to the absolute positioning of a UE. On the other hand, relative proximity of a UE in relation to other UEs is currently lacking in input data acquired by the NWDAF or the output data provisioned by the NWDAF.

Certain examples of the present disclosure provide one or more procedures for the NWDAF to assist a consumer NF to more accurately localise a cluster (or a set of) UEs via provisioning analytics and/or prediction information related to relative proximity.

Certain examples provide a technique allowing an NF (e.g. 5G Location management function (LMF), Gateway Mobile Location Centre (GMLC), or Application server (AS)) in a 5G system to acquire analytics and/or prediction data relevant for identifying a cluster (or a set) of UEs in relative proximity of each other.

Certain examples provide one or more signalling procedures for the NWDAF to collect information (e.g. via one or more newly defined IEs) relevant to the instant proximity of a set of UEs, for example via Minimization of Driving Test (MDT) procedures of the OAM.

Certain examples provide one or more signalling procedures for the NWDAF to acquire information (e.g. via one or more newly defined IEs) concerning pattern of proximity changes of a set of UEs, for example via DCAF.

Certain examples provided one or more signalling procedures for the NWDAF to combine input data on the instance proximity information (e.g. from MDT) with pattern of proximity changes of a set of UEs (e.g. from DCAF) and to provision output analytics and/or prediction data related to proximity pattern changes per cluster (or set) of UEs.

Certain examples provide signalling procedures for collecting UE location data (e.g. from AMF) and UE trajectory data (e.g. from AF) separately to or in addition to UE proximity data.

Certain examples provide data required for NF load (per area of interest) statistics and predictions, and a signalling procedure for providing such data.

The procedures disclosed herein refer to various network functions/entities. Detailed descriptions of known functions/entities are omitted for conciseness. The skilled person will appreciate that certain functions/entities and their definitions are disclosed in various standards documents. For example, the following functions/entities are defined in at least 3GPP TS 23.288, TS 23.501 and TS 23.502:

Network Data Analytic Function (NWDAF)
Minimization of Driving Test (MDT)
Operations, Administration and Maintenance (OAM)
User Equipment (UE)
Radio Access Network (RAN)
Data Collection Application Function (DCAF)
Network Repository Function (NRF)

FIG. 1 is a flow diagram of a first example of the present disclosure illustrating an exemplary procedure for collecting relative proximity information.

In operation S11, a Consumer NF sends a request to the NWDAF for analytics related to relative proximity. For example, the request may be sent using either the Nnwdaf_AnalyticsInfo or Nnwdaf_AnalyticsSubscription service.

The request may include information defining an analytics type, information defining the target for analytics, and information defining one or more analytics filters.

The information defining the analytics type may be an Analytics ID. For example, the Analytics ID may be set to "relative proximity information", or any other newly defined analytics ID set for this purpose.

The target for analytics reporting may be, for example, a single UE, group of UEs (e.g. UE1 and UE2 in the example of FIG. 1), or any UE.

One or more analytics filters may be set, for example to indicate the proximity range or any other suitable criteria to be considered for relative proximity. For example, this can be one or more of an area of interest, specific directions of interest, a ranging distance, or other forms of indication. Other analytics filters may also be set, for example to indicate a minimum or maximum number of UEs to be accounted for relative positioning. Other attributes may be indicated as analytics filters, for example defining certain velocity, average speed, orientation or mobility trajectory to be accounted for relative positioning. Other analytics filters may be set to indicate S-NSSAI, DNN, analytics target period, or preferred level of accuracy of the analytics.

The Consumer NF may request statistics or predictions or both. These may be requested for a given time window.

In operations S12-S15, NWDAF collects data from OAM. In certain examples, this procedure may be carried out if the request in operation S11 is authorized. In order to provide the requested analytics, the NWDAF may subscribe to OAM services to retrieve information relevant to the instant proximity of a set of UEs. For example, this information may be retrieved via Minimization of Driving Test (MDT) procedures of the OAM. In certain examples, the NWDAF may collect MDT input data per individual UE from OAM. An example set of information to be provided to the NWDAF is defined in Table 1 below. In various examples, any suitable combination of one or more of the items of information in Table 1 may be provided.

In operations S16-S17, UE input data is collected. In certain examples, the data collection may be carried out if the request in operation S11 is authorized. In order to provide the requested analytics, NWDAF may follow the UE Input Data Collection Procedure via the DCAF to acquire information concerning pattern of proximity changes of a set of UEs (e.g. UE1 and UE2 in the example of FIG. 1). DCAF may collect proximity data directly from UE (or UE Application). Alternatively or additionally, DCAF may collect proximity data indirectly via Proximity Application Server (ProSc AS) in coordination with 5G Direct Discovery Network Management Function (5G DDNMF).

The NWDAF may subscribes to the AF services as described above. This may be done, for example, by invoking either Nnef_EventExposure_Subscribe for untrusted DCAF or Naf_EventExposure_Subscribe service for trusted DCAF. The subscription request may include, for example (Event ID=Relative Proximity, Event Filter information, Target of Event Reporting). The target of event reporting and/or Event Filter information may be set according to the target of analytics reporting and/or analytics filters set during operation S11.

In certain examples, one or more new event filters may be defined for relative proximity to indicate to DCAF how to process the data from individual UEs to determine the set of UEs to be accounted for relative proximity.

In the case of trusted DCAF, the NWDAF may provide one or more of the Area of Interest, proximity range, or other criteria to the DCAF on the resolution of TAIs or any other finer resolution recognisable by the 5GC. In the case of an untrusted DCAF, NEF may translate the requested criteria provided as an event filter by the NWDAF into geographic zone identifier(s) or other newly defined geographic range identifier(s) or geographic direction identifier(s) that act as event filter(s) for the DCAF.

In certain examples, the DCAF may process (e.g. anonymize, aggregate and/or normalize) the data from individual UEs based on Event Filters indicated by the NWDAF to determine the set of UEs to be accounted for relative proximity before notifying that directly (in the case of trusted DCAF) or via NEF (in the case of untrusted DCAF) to the NWDAF. An example set of information to be provided to the NWDAF is defined in Table 2 below. In various examples, any suitable combination of one or more of the items of information in Table 2 may be provided.

In operation S18, the NWDAF derives the requested analytics.

In operation S19, the NWDAF provides the requested analytics (e.g. relative proximity information) to the consumer NF. In certain examples, the analytics may be provided to the consumer NF along with corresponding information, for example the corresponding Validity Period, any Validity Area, Validity Direction of interest, and/or ranging distance. For example, the analytics may be provided using either a Nnwdaf_AnalyticsInfo_Request response or Nnwdaf_AnalyticsSubscription_Subscribe response, depending on the service used in operation S11.

Example sets of information to be provided to the consumer NF from the NWDAF is defined in Table 3 (in the case of relative proximity statistics) and Table 4 (in the case of relative proximity predictions) below. In various examples, any suitable combination of one or more of the items of information in Table 3 and/or Table 4 may be provided.

In operations S110-S112, new and/or updated analytics may be provided to the consumer NF. For example, if, at previous operation S11, the consumer NF has subscribed to receive continuous reporting of analytics (e.g. relative proximity information), the NWDAF may generate new and/or updated analytics. The new and/or updated analytics may be provided to the consumer NF at any suitable time. For example, the new and/or updated analytics may be provided when relevant according to an Analytics target period and/or Reporting Threshold. In certain examples, the analytics may be provided to the consumer NF along with corresponding information, for example the corresponding Validity Period, any Validity Area, Validity Direction of interest, and/or ranging distance.

Figure 2:
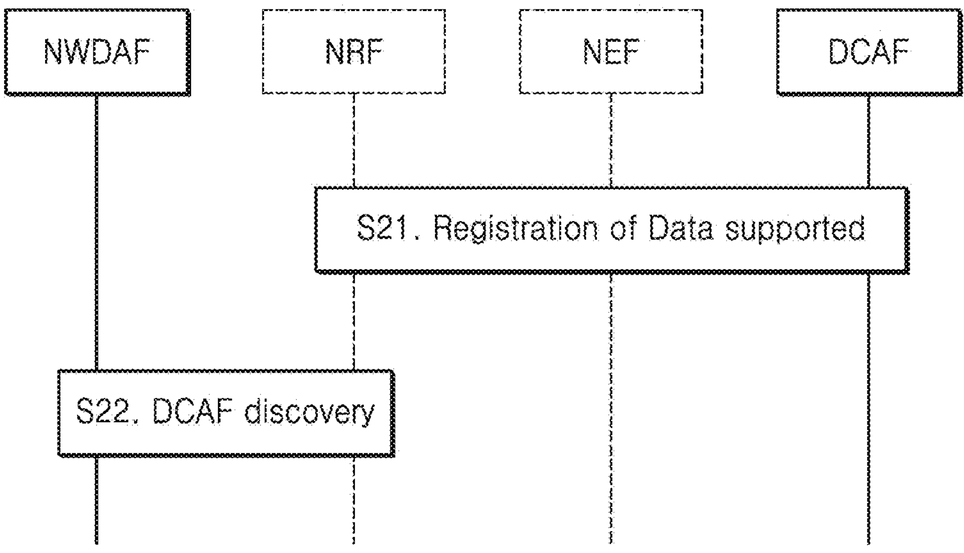
FIG. 2 is a flow diagram of a second example of the present disclosure illustrating an exemplary procedure for registering new DCAF capabilities in NRF for DCAF discovery.

The skilled person will appreciate that the present disclosure is not limited to the example of FIG. 2. For example, in certain alternative examples, the NWDAF may receive input data from OAM/MDT but not DCAF, or the NWDAF may receive input data from DCAF but not MDT/OAM. In other alternative examples, entities other than MDT/OAM and DCAF may provide the input data and/or other types of input data may be additionally or alternatively provided by MDT/OAM, DCAF and/or one or more other network entities. In other alternative examples, operations S110-S112 may be omitted, for example if the consumer NF has not subscribed to receive continuous reporting of analytics. In various examples, the consumer NF may request analytics from NWDAF, and may receive the requested analytics from NWDAF, using any suitable types of request/response messages, and are not limited to the specific messages of the example of FIG. 2. The skilled person will appreciate that other various fall within the scope of the present disclosure.

Input Data to the NWDAF from Different Sources

TABLE 1

| Proximity information collected from OAM | | |
|---|---|---|
| Information | Source | Description |
| Per UE information | OAM | |
| >Speed | | UE Speed |
| >Orientation | | UE Orientation |
| >Instant proximity set | | A (set of) UE ID(s) or Group ID(s) in the instant proximity of a target UE |

TABLE 2

Proximity information collected via DCAF/NEF

| Information | Source | Description |
|---|---|---|
| Proximity Attribute | DCAF/ NEF | Characterise a set of UEs in relative proximity based on the criteria set |
| >Number of UEs | | Total number of UEs that fulfil a proximity criteria |
| >Timestamp | | A time stamp of time that the proximity attribute derived |
| >Application ID(s) | | Identifying the applications(s) providing this information |
| >List of UE IDs | | UE IDs that fulfil a proximity criteria |
| >Other attribute(s) | | Other attributes the set of UEs in proximity fulfil as a collective attribute (e.g. destination, route, average speed, time of arrival) |
| >Confidence | | Confidence on relative proximity data |

Output Data from the NWDAF to the Consumer NF

TABLE 3

Relative proximity statistics

| Information | Description |
|---|---|
| UE group ID or set of UE IDs | Identifies a group of UEs or a set of UEs, e.g. internal group ID, external group ID, list of SUPIs, list of GPSIs or other external UE IDs |
| Time slot entry (1 . . . max) | List of time slots during the Analytics target period |
| >Time slot start | Time slot start within the Analytics target period |
| >Duration | Duration of the time slot |
| >UE proximity attribute | Observed proximity data |
| >>relative proximity pattern | Observed pattern of proximity changes |
| >>Sampling Ratio | Percentage of UEs accounted based on proximity criteria |

TABLE 4

Relative proximity predictions

| Information | Description |
|---|---|
| UE group ID or set of UE IDs | Identifies a group of UEs or a set of UEs, e.g. internal group ID, external group ID, list of SUPIs, list of GPSIs or other external UE IDs |
| Time slot entry (1 . . . max) | List of predicted time slots |
| >Time slot start | Time slot start time within the Analytics target period |
| >Duration | Duration of the time slot |
| >UE proximity attribute | Predicted proximity data |
| >>relative proximity pattern | Predicted pattern of proximity changes |
| >>Confidence | Confidence of this prediction |
| >>Sampling Ratio | Percentage of UEs accounted based on proximity criteria |

FIG. 2 is a flow diagram of a second example of the present disclosure illustrating an exemplary procedure for registering new DCAF capabilities in NRF for DCAF discovery.

In operation S21, DCAF registers its capabilities.

In the case of a trusted DCAF, the DCAF may directly register its capabilities in NRF. In certain examples, the DCAF registration profile may include any suitable information, for example in the form of one or more IEs. For example, the registration profile may include any suitable combination of one or more of the S-NSSAI and/or DNN corresponding to a DCAF that can be used for relative proximity, supported application IDs, and any relevant Event IDs defined for relative proximity. In certain examples, the registration profile may include designated group IDs defined for relative proximity purpose. In addition, DCAF may register an indicator within NRF, reflecting the support of data collection for relative proximity and/or reflecting the support for certain data processing for relative proximity. DCAF may also include other relevant IEs, for example minimum and/or maximum accuracy of the proximity data and/or the confidence range of the data that can be supported.

In the case of an untrusted DCAF, an NEF, based on implementation or configuration (e.g. via OAM), may register the untrusted DCAF capabilities within the NRF. The DCAF registration profile in the case of an untrusted DCAF may contain some or all of the same information as the DCAF registration profile in the case of a trusted DCAF, as described above.

In operation S22, NWDAF discovers DCAF via NRF. During the DCAF discovery via NRF, NWDAF may consider all IEs registered per DCAF profile in the previous operation S21 for the purpose of DCAF selection.

The skilled person will appreciate that the technique disclosed in relation to FIG. 2 may be used in combination with, or independently from, the technique disclosed in relation to FIG. 1.

Certain examples of the present disclosure provide a method for providing information relating to the relative proximity of one or more UEs in a network comprising the UEs and a first network entity (e.g. NWDAF) providing network analytics, the method comprising: receiving, by the first network entity from a second network entity (e.g. NF), a request for network analytics (e.g. Nnwdaf_AnalyticsInfo or Nnwdaf_AnalyticsSubscription); receiving, by the first network entity from one or more third network entities, input data relating to the UEs; generating, by the first network entity, analytics based on the input data; and providing the generated analytics to the second network entity as a response to the request (e.g. Nnwdaf_AnalyticsInfo_Request response or Nnwdaf_AnalyticsSubscription_Subscribe response).

In certain examples, the analytics subscription request may comprise an Analytics ID indicating "relative proximity information".

In certain examples, the analytics subscription request may comprise a target for analytics reporting.

In certain examples, the target for analytics reporting may comprise one or more of: a single UE; a group of UEs; and any UE.

In certain examples, the analytics subscription request may comprise one or more analytics filters.

In certain examples, the one or more analytics filters may comprise one or more of: a proximity range (e.g. an area of interest, one or more directions of interest, and/or a ranging distance); a minimum or maximum number of UEs to be accounted for relative positioning; a velocity, average speed, orientation, and/or mobility trajectory to be accounted for relative positioning; an S-NSSAI; a DNN; an analytics target period; and a specified level of accuracy of the analytics.

In certain examples, the one or more third network entities may comprise one or both of: an OAM entity; and a DCAF entity.

In certain examples, the input data received from a third network entity (e.g. an OAM entity) may comprise input data relating to the instant proximity of a set of UEs (e.g. via an MDT procedure of the OAM entity).

In certain examples, the input data may comprise information according to the following table:

| Information | Source | Description |
|---|---|---|
| Per UE information | OAM | |
| >Speed | | UE Speed |
| >Orientation | | UE Orientation |
| >Instant proximity set | | A (set of) UE ID(s) or Group ID(s) in the instant proximity of a target UE. |

In certain examples, the input data received from a third network entity (e.g. a DCAF entity) may comprise input data relating to a pattern of proximity changes of a set of UEs.

In certain examples, the input data may comprise information according to the following table:

| Information | Source | Description |
|---|---|---|
| Proximity Attribute | DCAF/ NEF | Characterise a set of UEs in relative proximity based on the criteria set |
| >Number of UEs | | Total number of UEs that fulfil a proximity criteria |
| >Timestamp | | A time stamp of time that the proximity attribute derived. |
| >Application ID(s) | | Identifying the applications(s) providing this information |
| >List of UE IDs | | UE IDs that fulfil a proximity criteria. |
| >Other attribute(s) | | Other attributes the set of UEs in proximity fulfil as a collective attribute (e.g. destination, route, average speed, time of arrival) |
| >Confidence | | Confidence on relative proximity data |

-

In certain examples, the input data may comprise anonymized, aggregated and/or normalised data (e.g. data relating to individual UEs).

In certain examples, the analytics may comprise one or both of: statistic(s); and prediction(s).

In certain examples, the statistics may comprise information according to the following table:

| Information | Description |
|---|---|
| UE group ID or set of UE IDs | Identifies a group of UEs or a set of UEs, e.g. internal group ID, external group ID, list of SUPIs, list of GPSIs or other external UE IDs. |
| Time slot entry (1 . . . max) | List of time slots during the Analytics target period |
| >Time slot start | Time slot start within the Analytics target period |
| >Duration | Duration of the time slot |
| >UE proximity attribute | Observed proximity data |
| >>relative proximity pattern | Observed pattern of proximity changes |
| >>Sampling Ratio | Percentage of UEs accounted based on proximity criteria |

In certain examples, the predictions may comprise information according to the following table:

| Information | Description |
|---|---|
| UE group ID or set of UE IDs | Identifies a group of UEs or a set of UEs, e.g. internal group ID, external group ID, list of SUPIs, list of GPSIs or other external UE IDs. |
| Time slot entry (1 . . . max) | List of predicted time slots |
| >Time slot start | Time slot start time within the Analytics target period |
| >Duration | Duration of the time slot |
| >UE proximity attribute | Predicted proximity data |
| >>relative proximity pattern | Predicted pattern of proximity changes |
| >>Confidence | Confidence of this prediction |
| >>Sampling Ratio | Percentage of UEs accounted based on proximity criteria |

In certain examples, generating the analytics may comprise combining input data received from two or more third network entities (e.g. an OAM entity and a DCAF entity).

In certain examples, the analytics may relate to proximity pattern changes per set of UEs.

In certain examples, the method may further comprise: receiving further input data from the one or more third network entities; generating new and/or updated analytics based on the further input data; and providing the new and/or updated analytics to the second network entity.

In certain examples, the method may further comprise subscribing, by the first network entity, to one or more services provided by one or more of the third network entities for receiving the input data.

In certain examples, the subscription request to the third network entity may comprise one or more Event IDs, target for event reporting, and/or event filters corresponding to one or more Analytics IDs, target for analytics, and/or analytics filters included in the request for analytics received by the first network entity from the second network entity.

In certain examples, at least one of the third network entities (e.g. DCAF) may collect information (e.g. proximity data) from one or more UEs for providing the input data to the first network entity.

In certain examples, the at least one third network entity may collect the information directly from the one or more UEs and/or indirectly (e.g. via a proximity application server in coordination with a direct discovery network management function).

Certain examples of the present disclosure provide a method for registering a third network entity (e.g. DCAF) for discovery by a second network entity (e.g. NWDAF), the method comprising: if the third network entity is trusted, registering, by the third network entity, the capabilities of the third network entity directly with a network repository entity; and if the third network entity is untrusted, registering, by a fourth network entity (e.g. NEF), the capabilities of the third network entity with the network repository entity.

Certain examples of the present disclosure provide a first network entity (e.g. NWDAF entity) configured to operate according to a method of any aspect, example, embodiment and/or claim disclosed herein.

Certain examples of the present disclosure provide a second network entity (e.g. consumer NF, OAM entity, DCAF entity and/or UE) configured to cooperate with a first network entity of the preceding example according to a method of any aspect, example, embodiment and/or claim disclosed herein.

Certain examples of the present disclosure provide a network (or wireless communication system) comprising one or more network entities (e.g. first and/or second network entities) according to the preceding examples.

Certain examples of the present disclosure provide a computer program comprising instructions which, when the program is executed by a computer or processor, cause the computer or processor to carry out a method according to any aspect, example, embodiment and/or claim disclosed herein.

Certain examples of the present disclosure provide a computer or processor-readable data carrier having stored thereon a computer program according to the preceding example.

Figure 3:
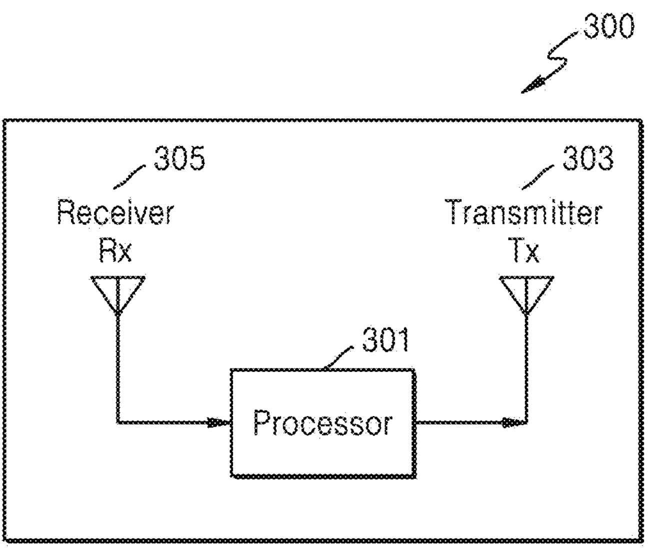
FIG. 3 is a block diagram of an exemplary network entity that may be used in certain examples of the present disclosure.

FIG. 3 is a block diagram of an exemplary network entity that may be used in examples of the present disclosure, such as the techniques disclosed in relation to FIG. 1 and/or FIG. 2. For example, the consumer NF, NWDAF, MDT/OAM, UE, DCAF, NRF, NEF and/or other NFs may be provided in the form of the network entity illustrated in FIG. 3. The skilled person will appreciate that a network entity may be implemented, for example, as a network element on a dedicated hardware, as a software instance running on a dedicated hardware, and/or as a virtualised function instantiated on an appropriate platform, e.g. on a cloud infrastructure.

The entity 300 comprises a processor (or controller) 301, a transmitter 303 and a receiver 305. The receiver 305 is configured for receiving one or more messages from one or more other network entities, for example as described above. The transmitter 303 is configured for transmitting one or more messages to one or more other network entities, for example as described above. The processor 301 is configured for performing one or more operations, for example according to the operations as described above.

NWDAF may also output load analytics, such as NF load statistics. NF load statistics information that may be output by the NWDAF are specified in the Tables 5 and 6 below, where these tables are provided as tables 6.5.3-1 and 6.5.3-2 in 3GPP TS 23.288 V17.0.0, and references within these tables refer to 3GPP TS 23.288 V17.0.0. The NWDAF services as defined in the clause 7.2 and 7.3 of 3GPP TS 23.288 V17.0.0 are used to expose the analytics. NF load statistics information and NF load predictions information are defined in Tables 5 and 6 (tables 6.5.3-1 and 6.5.3-2), respectively, below.

TABLE 5

| NF Load Statistics (Table 6.5.3-1) | |
|---|---|
| Information | Description |
| List of resource status (1 . . . max) | List of observed load information for each NF instance along with the corresponding NF id/NF Set ID (as applicable). |
| >NF type | Type of the NF instance. |
| >NF instance ID | Identification of the NF instance. |
| >NF status (NOTE 1) | The availability status of the NF on the Analytics target period, expressed as a percentage of time per status value (registered, suspended, undiscoverable). |
| >NF resource usage (NOTE 1) | The average usage of assigned resources (CPU, memory, disk). |
| >NF load (NOTE 1) | The average load of the NF instance over the Analytics target period. |
| >NF peak load (optional) (NOTE 1) | The maximum load of the NF instance over the Analytics target period. |
| >NF load (per area of interest) (NOTE 2) | The average load of the NF instances over the area of interest. |

(NOTE 1):
Analytics subset that can be used in "list of analytics subsets that are requested" and "Accuracy level per analytics subset".
(NOTE 2):
Applicable only to AMF load based on Input data in clause 6.5.2, Table 6.5.2-3 and Table 6.5.2-5.

TABLE 6

| NF Load Predictions (Table 6.5.3-2) | |
|---|---|
| Information | Description |
| List of resource status (1 . . . max) | List of predicted load information for each NF instance along with the corresponding NF id/NF Set ID (as applicable) |
| >NF type | Type of the NF instance |
| >NF instance ID | Identification of the NF instance |
| >NF status (NOTE 1) | The availability status of the NF on the Analytics target period, expressed as a percentage of time per status value (registered, suspended, undiscoverable) |
| >NF resource usage (NOTE 1) | The average usage of assigned resources (CPU, memory, disk) |
| >NF load (NOTE 1) | The average load of the NF instance over the Analytics target period |
| >NF peak load (optional) (NOTE 1) | The maximum load of the NF instance over the Analytics target period |
| >Confidence | Confidence of this prediction |
| >NF load (per area of interest) (NOTE 2) | The predicted average load of the NF instances over the area of interest. |

(NOTE 1):
Analytics subset that can be used in "list of analytics subsets that are requested" and "Accuracy level per analytics subset".
(NOTE 2):
Applicable only to AMF load based on Input data in clause 6.5.2, Table 6.5.2-3 and Table 6.5.2-5.

The variations on per-instance NF load and resource usage could be influenced by the number of running NF instances in addition to the load itself. To determine NF load (per area of interest), NWDAF can collect and take into account UE trajectory input data from the AF, defined in clause 6.7.2.2, Table 6.7.2-2 for UE mobility analytics in addition to MDT input data and/or collective behaviour input data, defined in clause 6.5.2, Table 6.5.2-3 and Table 6.4.2-5, respectively.

The predictions are provided with a Validity Period, as defined in clause 6.1.3.

The variations on per-instance NF load and resource usage could be influenced by the number of running NF instances in addition to the load itself.

Currently, the statistical input data acquired by the NWDAF when outputting NF load statistics (per area of interest) is not specified. Therefore, in accordance with the present disclosure, statistical information that the NWDAF takes into account when determining or estimating NF load (per area of interest) in the above tables is specified.

In particular, to determine or estimate NF load (per area of interest), NWDAF can collect and take into account UE trajectory input data from the Application Function (AF), as specified in Table 7 below, where this table is provided in clause 6.7.2.2, Table 6.7.2.2-2 of 3GPP TS 23.288 V17.0.0 for UE mobility analytics, in addition to Minimization of Drive Tests (MDT) input data and/or collective behaviour input data, defined in Tables 8 and 9 below, which are provided in clause 6.5.2, Table 6.5.2-3 and Table 6.5.2-5, of 3GPP TS 23.288 V17.0.0, respectively.

TABLE 7

| Service Data from AF related to UE mobility (Table 6.7.2.2-2) | |
|---|---|
| Information | Description |
| UE ID | Could be external UE ID (i.e. GPSI) |
| Application ID | Identifying the application providing this information |
| UE trajectory (1 . . . max) | Timestamped UE positions |
| >UE location | Geographical area that the UE enters |
| >Timestamp | A time stamp when UE enters this area |

Depending on a requested level of accuracy, data collection may be provided on samples (e.g. spatial subsets of UEs or UE group, temporal subsets of UE location information).

TABLE 8

| MDT input data for UE (Table 6.5.2-3) | | |
|---|---|---|
| Information | Source | Description |
| UE Speed | OAM (see NOTE 1) | UE Speed (see TS 37.320 [20]). |
| UE Orientation | OAM (see NOTE 1) | UE Orientation (see TS 37.320 [20]). |

(NOTE 1):
UE input data collection for a specific UE from OAM (via MDT), is as captured in clause 6.2.3.1.

TABLE 9

| AF input data to the NWDAF for Collective Behaviour of UEs (Table 6.5.2-5) | | |
|---|---|---|
| Information | Source | Description |
| Collective Attribute | AF/NEF (see NOTE 1) | Characterise collective attribute per set of UEs (see Table 6.5.2-4) within the area of interest. |
| >Number of UEs | | Total number of UEs that fulfil a collective behaviour within the area of interest. |
| >Timestamp | | A time stamp of time that the collective attribute derived. |
| >Application ID(s) | (see NOTE 2) | Identifying the application providing this information |

(NOTE 1):
For collective behaviour attribute, data processing procedure is as defined in clause 6.2.8.
(NOTE 2):
The application ID(s) (either external or Internal) is optional. If the application ID(s) is not provided, the relevant application ID(s) can be identified by NWDAF based on the relevant event ID as registered in NRF as covered in clause 6.2.8.

For the purpose of NF load analytics, the NWDAF may collect the information as listed in Table 8 (from OAM via MDT) and Table 9 via the AF (for trusted AF) or NEF (for untrusted AF).

The predictions are provided with a validity period, as defined in clause 6.1.3 of 3GPP TS 23.288 V17.0.0, and the number of resource status is limited by the maximum number of objects provided as part of Analytics Reporting Information. When multiple sources of data are used, the collected data may be combined and the estimating of the network load may be improved in accuracy. Further details on estimating NF load are set of in Annex 1.

Although specific input data (e.g. UE location data and UE trajectory data) has been described with respect to NF load (per area of interest) analytics performed by the NWDAF, this input data is not limited to being used for provision of NF load statistics, and the specified input data may be used for any NWDAF analytics. For example, the input data specified above in Tables 7-9 may be used in any analytics where absolute UE location data and/or UE trajectory data may be of relevance, and may be used in combination with other input data such as UE proximity information in order to enhance such information.

FIG. 4 is flow diagram that is similar to FIG. 1 but where UE location and UE trajectory data is also collected by the NWDAF and used to derive analytics, where the collection of the UE location and UE trajectory data may be performed in response to a specific request or as part of a standard proximity information analytics request. The statistical information that are based on absolute location (e.g. from AF or AMF) in different resolutions enable the NWDAF to do one or more of verify, cleanse or improve the accuracy of proximity location data collected from other sources (e.g. OAM and/or DCAF) when needed. For example, if some UEs cannot provide proximity information via DCAF or OAM due lack of support for certain UE application data or MDT data on the UE or when there are anomalies in proximity information absolute location information may be collected from UEs and utilised in place of or to augment the proximity information. Consequently, FIG. 4 may be considered to provide an approach where network analytics are based on multiple resolutions (i.e. types) of UE location information.

In operation S41, a Consumer NF sends a request to the NWDAF for analytics related to one or more of relative proximity between UEs, UE location, and UE trajectory. For example, the request may be sent using either the Nnwdaf_AnalyticsInfo or Nnwdaf_AnalyticsSubscription service. The request may include information defining an analytics type, information defining the target for analytics, and information defining one or more analytics filters. The Consumer NF can request statistics or predictions or both for a given time window.

The information defining the analytics type may be an Analytics ID. For example, the Analytics ID may be set to "relative proximity information" and/or one or more of any other newly defined analytics ID set for this purpose, such as "UE location", "UE trajectory", or "predicted UE location" for example. An analytics ID may also cover more than one of these data types.

The target for analytics reporting for proximity information, UE location information, or UE trajectory information can be a single UE, group of UEs (e.g. UE1 and UE2 in the FIG. 1) or any UE. With respect to proximity, analytic filters are set to indicate the proximity range or other criteria to be considered for relative proximity. This can be in the form of an area of interest, specific directions of interest, a ranging distance, or other forms of indication. Other analytics filters can also be set to indicate a minimum or maximum number of UEs to be accounted for relative positioning. Other attributes can be also indicated as analytics filters, e.g. defining certain velocity, average speed, orientation or mobility trajectory to be accounted for relative positioning. Other analytics filters can be set to indicate S-NSSAI, DNN, analytics target period or preferred level of accuracy of the analytics. Depending on the preferred level of accuracy, NWDAF determines the sources of data collection.

In operations S42-S45, NWDAF collects data from OAM. In certain examples, this procedure may be carried out if the request in operation S41 is authorized. In order to provide the requested analytics, the NWDAF may subscribe to OAM services to retrieve information relevant to the instant proximity of a set of UEs. For example, this information may be retrieved via Minimization of Driving Test (MDT) procedures of the OAM. In certain examples, the NWDAF may collect MDT input data per individual UE from OAM. An example set of information to be provided to the NWDAF is defined in Table 1. In various examples, any suitable combination of one or more of the items of information in Table 1 may be provided.

In operations S46-S47*a*, with respect to proximity analytics, UE input data is collected. In certain examples, the data collection may be carried out if the request in operation S41 is authorized. In order to provide the requested analytics, NWDAF may follow the UE Input Data Collection Procedure via the DCAF to acquire information concerning pattern of proximity changes of a set of UEs (e.g. UE1 and UE2 in the example of FIG. 1). DCAF may collect proximity data directly from UE (or UE Application). The proximity data can be processed and generated in the DCAF as a collective attribute based on aggregating and normalising individual UE data that are collected from a certain UE Application (client). Examples include: location data (either absolute or relative to other UEs), destination, route, average speed or time of arrival. Alternatively or additionally, DCAF may collect proximity data indirectly via Proximity Application Server (ProSe AS) in coordination with 5G Direct Discovery Network Management Function (5G DDNMF).

In operation S47*b*, absolute UE location and UE trajectory data is collected, which as for operations S46-S47*a*, may in some examples be if the request of operation S41 is authorized. The UE location and UE trajectory data may be collected from AF/AMF as set out above with respect to Table 7 for example. Operation S47*b* may be performed as standard as part of providing proximity analytics or may be performed in response to a particular trigger, such as a particular request received by the NWDAF, when there are deficiencies in the collected proximity information, or when there is a requirement for improved accuracy for example.

In operation S48 the NWDAF derives the requested analytics in accordance with the analytics and inputs that have been requested and collected.

In operation S49, the NWDAF provides the requested analytics (e.g. one or more of current or predicted relative proximity information, UE location information, and UE trajectory information or analytics derived from one or more of these) to the consumer NF. In certain examples, the analytics may be provided to the consumer NF along with corresponding information, for example, dependent on the type of analytics, one or more of a corresponding Validity Period, any Validity Area, Validity Direction of interest, and/or ranging distance. For example, the analytics may be provided using either a Nnwdaf_AnalyticsInfo_Request response or Nnwdaf_AnalyticsSubscription_Subscribe response, depending on the service used in operation S41.

Example sets of information to be provided to the consumer NF from the NWDAF is defined in Table 3 (in the case of relative proximity statistics), Table 4 (in the case of relative proximity predictions). Additionally, accuracy level achieved per relative proximity attribute can be included. In various examples, any suitable combination of one or more of the items of information in Tables 3 to 4 may be provided to the consumer NF dependent on the request of operation S41.

In operations S410-S412, new and/or updated analytics may be provided to the consumer NF. For example, if, at previous operation S41, the consumer NF has subscribed to receive continuous reporting of analytics, the NWDAF may generate new and/or updated analytics. The new and/or updated analytics may be provided to the consumer NF at any suitable time. For example, the new and/or updated analytics may be provided when relevant according to an Analytics target period and/or Reporting Threshold. In certain examples, the analytics may be provided to the consumer NF along with corresponding information, for example, dependent on the type of analytics, one or more of the corresponding Validity Period, any Validity Area, Validity Direction of interest, and/or ranging distance. Referring to operations S410*a*, S410*b*, and S410*c*, notification of new data may be provided to the NWDAF depending on the analytics that have been requested. For example, S410*a* and S410*b* may be provided when analytics related to UE proximity have been requested, and S410*c* may be provided when analytics relates to NF load (per area of interest) have been requested or other data related to UE location and proximity has been requested. S410*c* may also be provided when absolute UE location data and/or UE trajectory data is being used to enhance UE proximity information.

Although FIG. 4 has been described with reference to scenarios where proximity information and UE location and UE trajectory data are provided to/collected by the NWDAF, the method is not limited and in some examples only UE location and UE trajectory data are provided to/collected by the NWDAF dependent on the requested analytics, such that operations S42-S45, S46, S410*a* and S410*b* do not occur. For example, part of the approach and message exchanges of FIG. 4, may be applied to the provision of NF load (per area of interests) statistics and predictions described above.

The network entity illustrated in FIG. 3 may also be used in the techniques disclosed in relation to NF load determination/estimation and in relation to FIG. 4. For example, the consumer NF, NWDAF, MDT/OAM, UE, DCAF, NRF, AF/AMF, NEF and/or other NFs may be provided in the form of the network entity illustrated in FIG. 3. The skilled person will appreciate that a network entity may be implemented, for example, as a network element on a dedicated hardware, as a software instance running on a dedicated hardware, and/or as a virtualised function instantiated on an appropriate platform, e.g. on a cloud infrastructure.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

Further examples related to the estimation of a network function load for an area of interest are set out in the following numbered clauses, where the subject matter of these clauses may be combined with the subject matter disclosed above with respect to the estimation of a network function load for an area of interest.

The invention claimed is:

1. A method performed by a first network entity in a mobile communication system for providing information relating to relative proximity of user equipments (UEs), the method comprising:
- receiving, from a second network entity, a request for network analytics;
- receiving, from one or more third network entities, input data relating to the UEs;
- generating analytics based on the input data; and
- providing the generated analytics to the second network entity as a response to the request,
- wherein the request comprises an analytics identifier (ID) indicating relative proximity information, and
- wherein the input data includes speed information and orientation information per individual UE retrieved from an operations administration and maintenance (OAM) entity.

2. The method of claim 1, wherein the request comprises a target for analytics reporting.

3. The method of claim 2, wherein the target for analytics reporting comprises one or more of:
- a single UE;
- a group of UEs; and
- any UE.

4. The method of claim 1, wherein the request comprises one or more analytics filters.

5. The method of claim 4, wherein the one or more analytics filters comprise one or more of:
- an area of interest;
- directions of interest;
- a number of UEs to be accounted for relative positioning;
- attributes to be accounted for relative positioning including at least one of a velocity, average speed, orientation, and mobility trajectory;
- a single-network slice selection assistance information (S-NSSAI); and
- a data network name (DNN).

6. The method of claim 1, wherein the input data includes one or more information elements in the following table:

| Information | Source | Description |
|---|---|---|
| Proximity Attribute | Application Function for Data Collection (DCAF) | Characterise a set of UEs in relative proximity based on the criteria set |
| >Number of UEs | | Total number of UEs that fulfil a proximity criteria |
| >Timestamp | | A time stamp of time that the proximity attribute derived |
| >Application ID(s) | | Identifying the applications(s) providing this information |
| > List of UE IDs | | UE IDs that fulfil a proximity criteria |
| >Other attribute(s) | | Other attributes the set of UEs in proximity fulfil as a collective attribute (e.g. destination, route, average speed, time of arrival) |
| > Confidence | | Confidence on relative proximity data. |

7. The method of claim 1, wherein the generated analytics includes relative proximity statistics information the UEs or relative proximity predictions information of the UEs.

8. A first network entity in a mobile communication system for providing information relating to relative proximity of user equipments (UEs), the first network entity comprising:
- a transceiver; and
- a controller configured to:
  - receive, from a second network entity via the transceiver, a request for network analytics,
  - receive, from one or more third network entities via the transceiver, input data relating to the UEs,
  - generate analytics based on the input data, and
  - provide the generated analytics to the second network entity as a response to the request,
- wherein the request comprises an analytics identifier (ID) indicating relative proximity information, and
- wherein the input data includes speed information and orientation information per individual UE retrieved from an operations administration and maintenance (OAM) entity.

9. The first network entity of claim 8, wherein the request comprises a target for analytics reporting.

10. The first network entity of claim 9, wherein the target for analytics reporting comprises one or more of:
- a single UE;
- a group of UEs; and
- any UE.

11. The first network entity of claim 8, wherein the request comprises one or more analytics filters.

12. The first network entity of claim 11, wherein the one or more analytics filters comprise one or more of:
- an area of interest;
- directions of interest;
- a number of UEs to be accounted for relative positioning;
- attributes to be accounted for relative positioning including at least one of a velocity, average speed, orientation, and mobility trajectory;
- a single-network slice selection assistance information (S-NSSAI); and
- a data network name (DNN).

13. The first network entity of claim 8, wherein the input data includes one or more information elements in the following table:

| Information | Source | Description |
|---|---|---|
| Proximity Attribute | Application Function for Data Collection (DCAF) | Characterise a set of UEs in relative proximity based on the criteria set |
| >Number of UEs | | Total number of UEs that fulfil a proximity criteria |
| >Timestamp | | A time stamp of time that the proximity attribute derived |
| >Application ID(s) | | Identifying the applications(s) providing this information |
| > List of UE IDs | | UE IDs that fulfil a proximity criteria |
| >Other attribute(s) | | Other attributes the set of UEs in proximity fulfil as a collective attribute (e.g. destination, route, average speed, time of arrival) |
| > Confidence | | Confidence on relative proximity data. |

14. The first network entity of claim 8, wherein the generated analytics includes relative proximity statistics information of the UEs or relative proximity predictions information of the UEs.

15. The first network entity of claim 8, wherein the first network entity is a network data analytics function (NWDAF) and the second network entity is a network function (NF).

* * * * *